No. 641,548. Patented Jan. 16, 1900.
W. H. ROSE.
DISINFECTING DEVICE.
(Application filed Sept. 26, 1899.)
(No Model.)
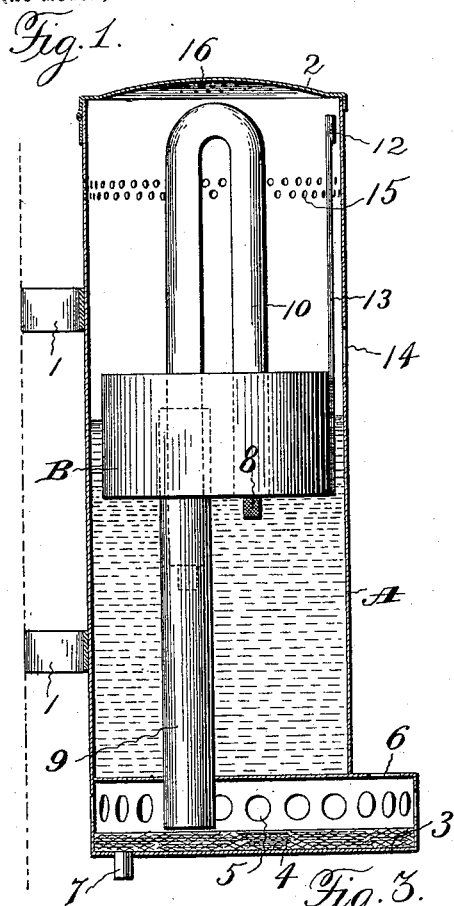
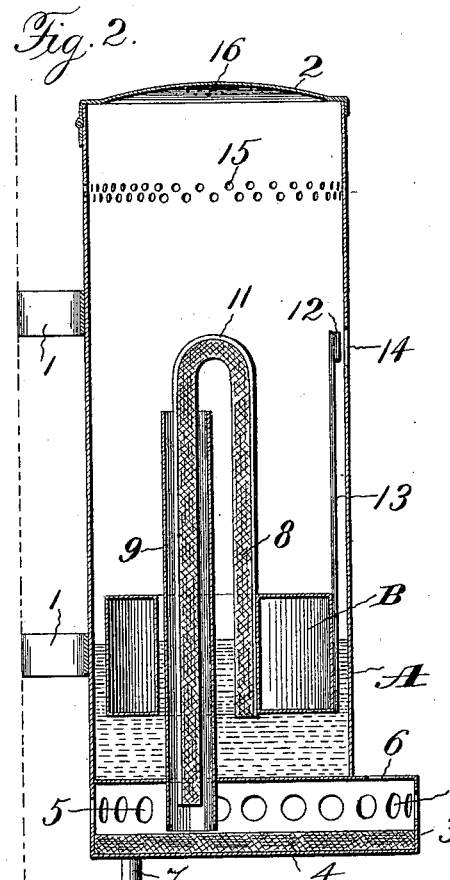
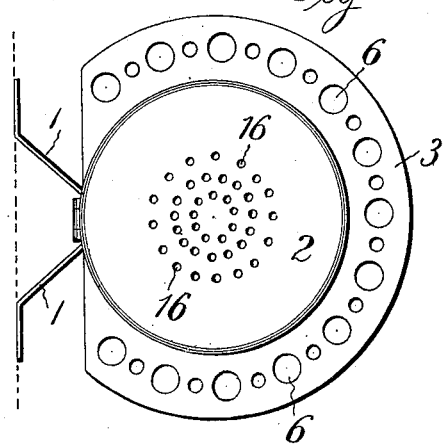
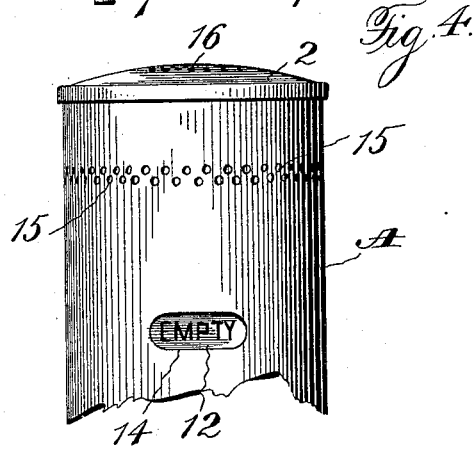
WITNESSES
Jas. E. Hutchinson
Arthur L. Bryant
INVENTOR
William H. Rose
By Watson & Watson
Attorneys

UNITED STATES PATENT OFFICE.

WILLIAM H. ROSE, OF BALTIMORE, MARYLAND.

DISINFECTING DEVICE.

SPECIFICATION forming part of Letters Patent No. 641,548, dated January 16, 1900.

Application filed September 26, 1899. Serial No. 731,764. (No model.)

*To all whom it may concern:*

Be it known that I, WILLIAM H. ROSE, a citizen of the United States, residing at the city of Baltimore, in the State of Maryland, have invented certain new and useful Improvements in Disinfecting Apparatus, of which the following is a specification.

My invention relates to that class of disinfecting apparatus in which the liquid contained in a suitable reservoir is slowly discharged therefrom by capillary attraction.

The principal object of the invention is to obtain a uniform discharge, and thus secure the effect desired continuously and with a minimum expenditure of the fluid.

The invention is illustrated in the accompanying drawings, in which—

Figure 1 is a side view of the apparatus, partly in section. Fig. 2 is a similar view, wholly in section and illustrating a slightly-modified form. Fig. 3 is a plan view of the apparatus shown in Fig. 1, and Fig. 4 is a partial front view of the same.

Referring to the drawings, A indicates a reservoir, which is preferably constructed of thin metal in the form of a cylinder, as shown. This reservoir is adapted to be attached to a wall or other support by means of the brackets 1, and it is provided with a suitable lid or cover 2. Below the reservoir is a pan 3, into which the liquid is discharged from the reservoir by means to be presently described. The pan preferably contains a wick or mat of fibrous material 4, which is adapted to hold a small amount of the fluid, and it is provided with side and top openings 5 6, through which a portion of the liquid in the pan is discharged in the form of vapor. The side and top openings permit of free circulation of air and promote evaporation. The side openings may extend all around the vessel, and the top openings are located in a portion of the top of the pan which projects beyond the reservoir. The top of the pan and the bottom of the reservoir may be in one piece, as shown. It is designed that the supply of liquid to the pan shall exceed the evaporation therefrom, leaving a surplus to drip through an opening 7 into any pipe or vessel to be disinfected.

The liquid in the reservoir A rises through a wick 8, which is U-shaped, the shorter leg of the U extending into the reservoir and the longer leg extending down through a tube 9 and discharging into the pan 3. It has been found that the rate of discharge through the wick will depend largely on the difference in elevation of its lower end and the surface of the liquid into which the upper end dips, and I preferably arrange the wick to be adjustable, so that this difference in elevation can be varied. I accomplish this, as shown in Fig. 1, by placing the wick loosely in the U-shaped tube 10, the wick being adjustable therein.

A constant difference in elevation between the lower end of the wick and the surface of the fluid in the reservoir is absolutely essential in order to maintain a constant discharge of the fluid, and it is the chief feature of my invention to maintain this constant difference. I attain this object by mounting the wick on a suitable float B. As shown in Fig. 1, the wick-tube 10 has its shorter leg connected to the float and its longer leg extending down through the tube 9, the wick being thereby held centrally in the tube and in position to discharge into the pan below. It will be evident that the discharge through the wick will be constant regardless of the amount of liquid in the reservoir. In Fig. 2 the wick is shown as attached to a U-shaped wire 11, which wire is carried by the float B. The tube 10 is preferably connected to the wire, but any other equivalent device may be substituted without departing from the spirit of the invention. In like manner the shape and material of the float may also be varied.

I preferably connect to the float in some suitable manner a tablet 12, having thereon the word "Empty" or some other sign to indicate when it is time to refill the reservoir. As shown, the tablet 12 is carried on a plate 13, which is attached to the float.

Near the upper end of the reservoir is a series of openings 15, and another series 16 is preferably provided in the cover. These openings permit of a circulation of air through the reservoir, and the vapor thus carried off helps to deodorize the atmosphere.

It will be evident that my improved apparatus is extremely simple and very effective. After being set up it requires absolutely no attention, excepting to be occasionally filled—say once in three or four weeks. It is not necessary to separate any of the parts to fill the reservoir. The width of the reservoir is preferably such that the bend of the wick 8 will be at the top when the reservoir is sufficiently filled, as shown in Fig. 1. To fill the reservoir, it is only necessary to lift the lid and pour in the fluid until the float rises sufficiently to carry the bend of the tube or wick to the top of the reservoir.

Having described my invention, what I claim, and desire to secure by Letters Patent, is—

1. In a disinfecting apparatus, the combination with a suitable reservoir, of a tube vertically arranged therein having a discharge-opening at its lower end, a float in said reservoir, and a U-shaped wick carried by the float, one leg of said wick extending into said tube, for the purpose set forth.

2. In a disinfecting apparatus, the combination with a reservoir, of a vertically-arranged tube having its upper end in communication with the reservoir and having a discharge-opening in its lower end, a float in said reservoir, a U-shaped wick-support having one leg connected to said float, and the other leg extending into said tube, and a wick carried by said support, for the purpose set forth.

3. In a disinfecting apparatus, the combination with a suitable reservoir, of the tube extending upward from the bottom of the reservoir, the float in said reservoir, a U-shaped tube having one leg connected to the float and the other leg arranged in said first-named tube, and a wick in said U-shaped tube, for the purpose set forth.

4. In a disinfecting apparatus, the combination with a reservoir, of a tube extending upward from the bottom of said reservoir, a float in said reservoir, a wick carried by the float and arranged to discharge into said tube, and an indicator carried by the float and arranged to indicate at an opening in the reservoir the amount of fluid in said reservoir, for the purpose set forth.

In testimony whereof I affix my signature in presence of two witnesses.

WILLIAM H. ROSE.

Witnesses:
J. A. WATSON,
W. CLARENCE DUVALL.